United States Patent Office 3,534,857
Patented Oct. 20, 1970

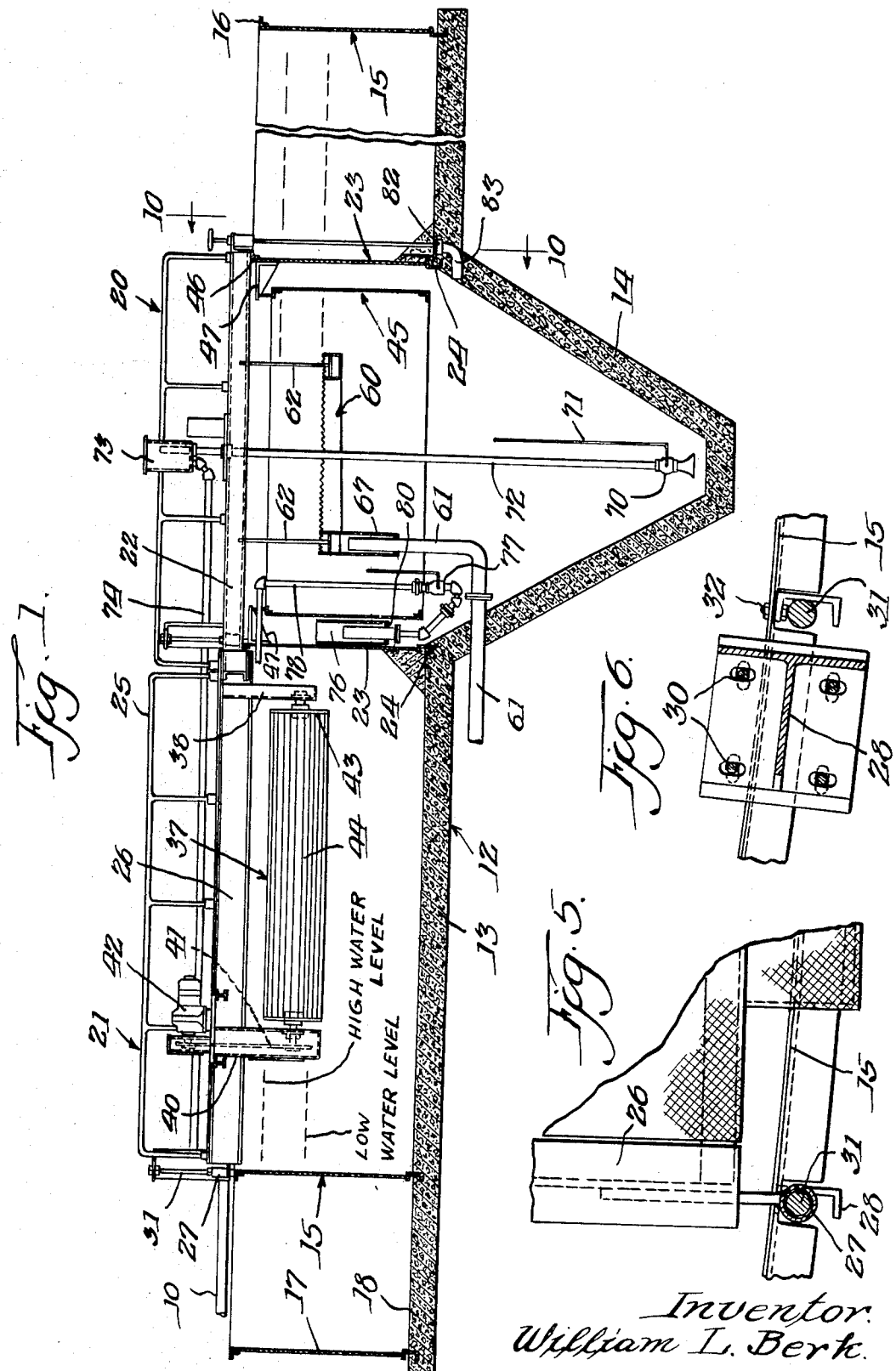

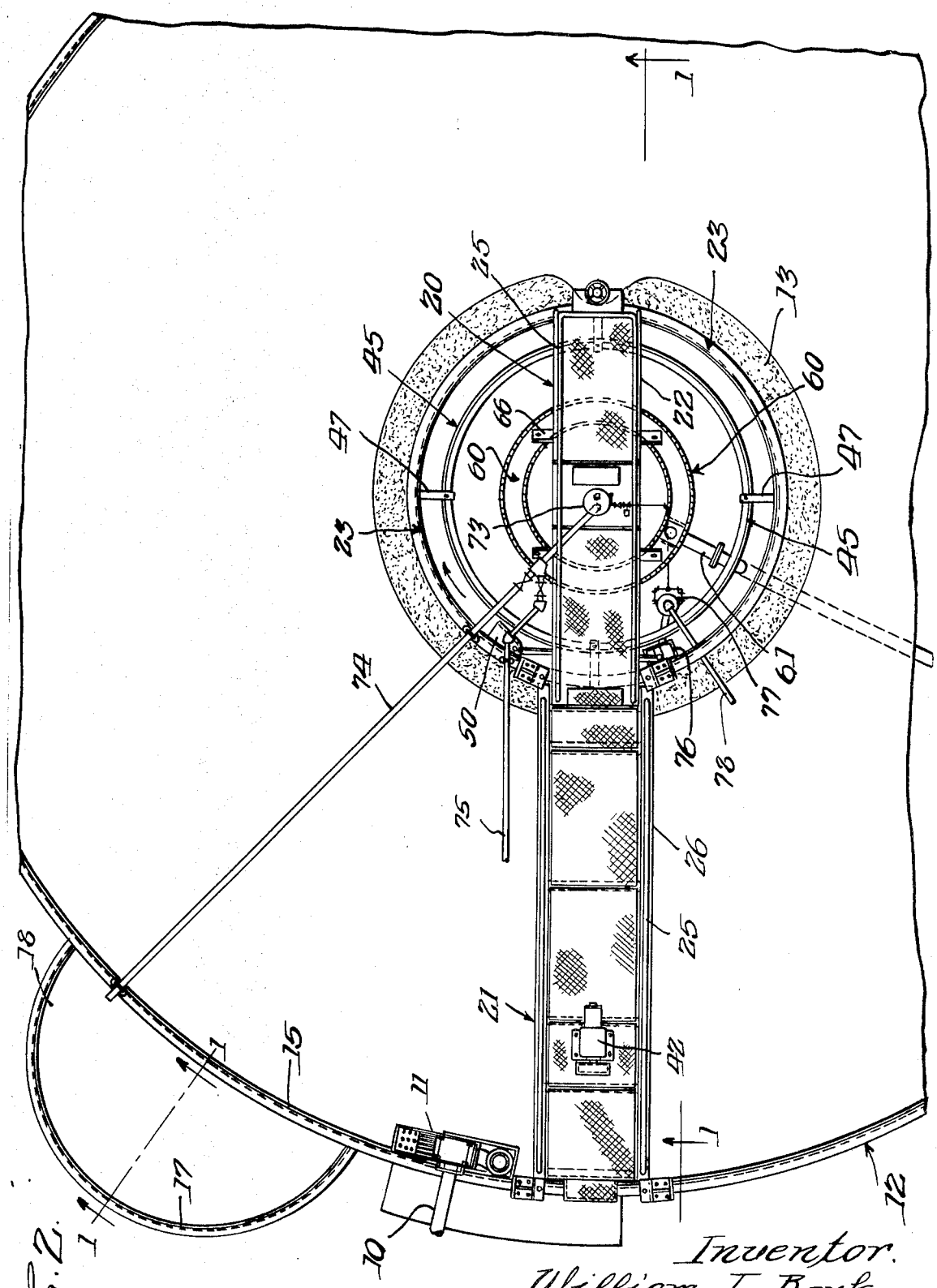

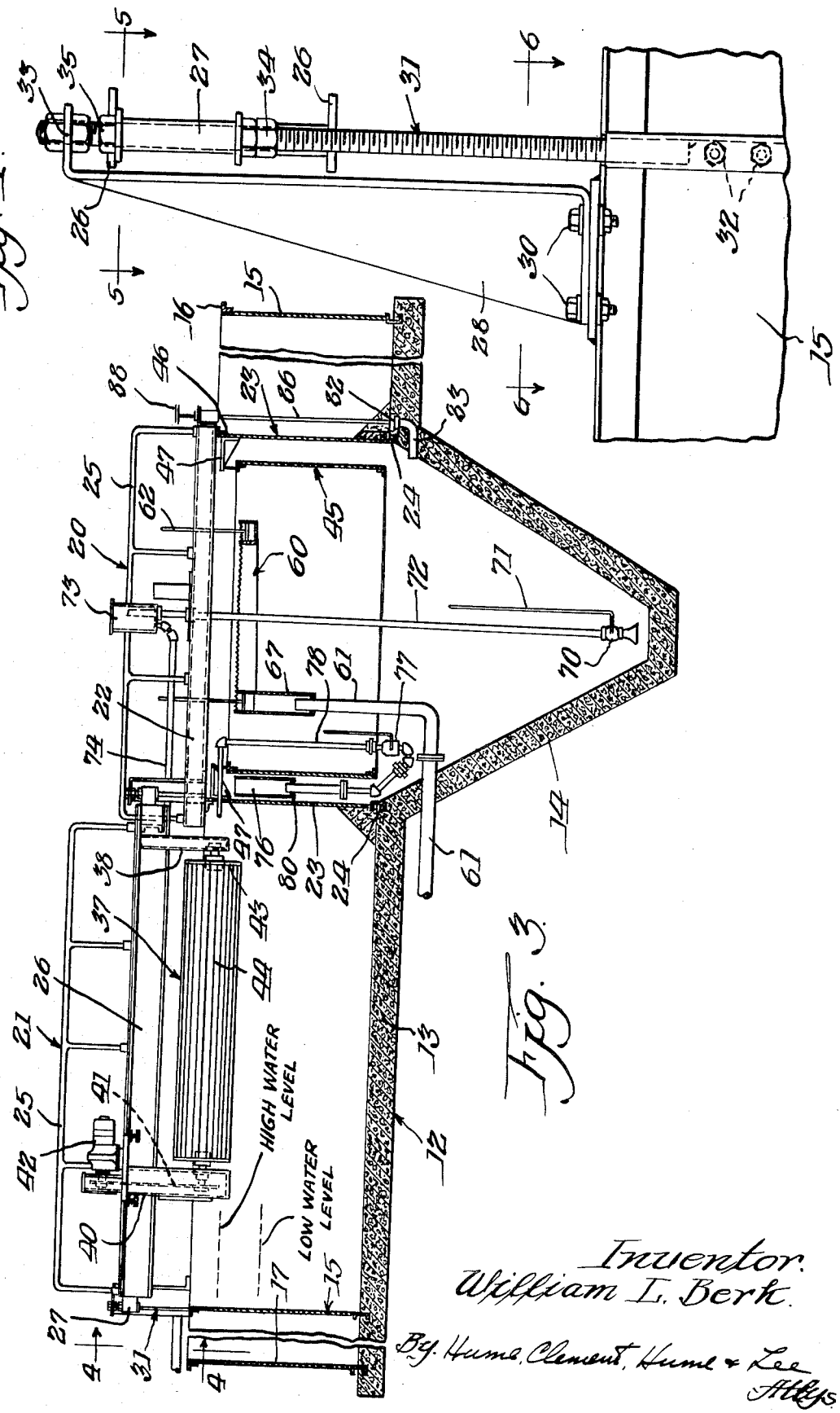

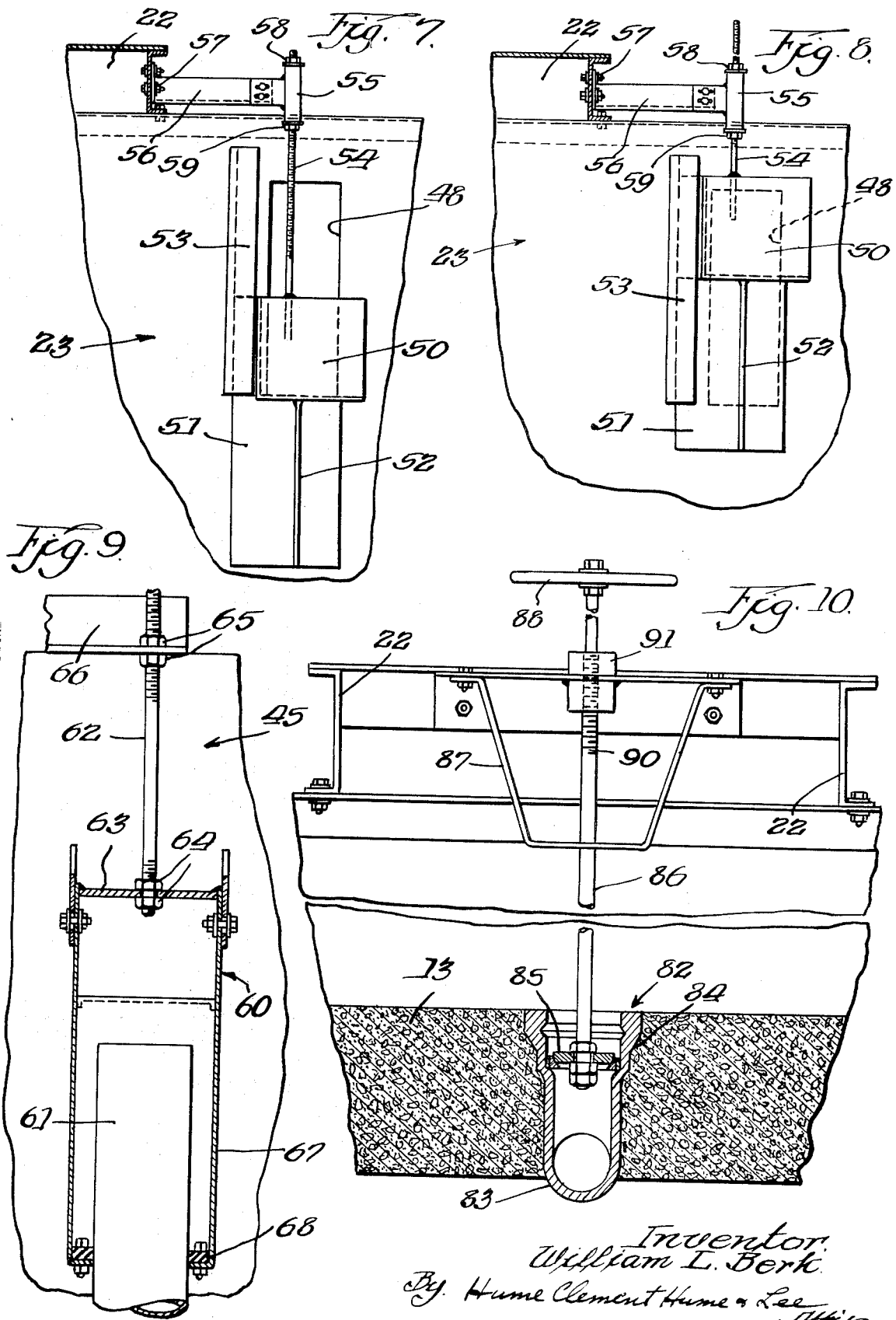

3,534,857
EXPANDABLE AEROTOR PLANTS FOR TREATMENT OF SEWAGE AND INDUSTRIAL WASTES
William L. Berk, Mount Prospect, Ill., assignor to Lakeside Equipment Corporation, Bartlett, Ill., a corporation of Illinois
Filed Sept. 9, 1968, Ser. No. 758,271
Int. Cl. C02c 1/10
U.S. Cl. 210—151          5 Claims

ABSTRACT OF THE DISCLOSURE

In the aerotor plant as disclosed a compact and unitary apparatus is secured since the tanks forming the various chambers are concentrically arranged around a central clarifying chamber, and the sewage and industrial wastes to be purified are caused to flow from chamber to chamber. In order that the plant may operate at the optimum efficiency, the invention provides for the vertical adjustment of the effluent weir in the final tank and also for the vertical adjustment of the cage rotor in the aeration chamber. The influent baffle which admits the liquid to be purified to the annular race is also vertically adjustable. The water level in the various chambers throughout the apparatus can thus be adjusted to conform with present load capacities and also with materially increased load capacities such as may be encountered in future years.

---

The invention relates to the purification and disposal of sewage and industrial wastes and has reference more particularly to aerotor plants and to operating methods for such plants for the complete and economical treatment of used water from municipal and industrial establishments.

The body of sewage and other used water when in an oxidation ditch, for example, is in contact at its surface with atmosphere oxygen. When such waters are suitably agitated the agitation accomplishes definite and beneficial results. The surface agitation continuously brings fresh portions of the waste material, which is depleted or partially depleted of oxygen, into contact with the oxygen of the atmosphere. These fresh portions of waste material appearing at the surface become aerated and the dissolved oxygen immediately begins to stream downwardly through the liquid. This downward movement of the absorbed oxygen is materially aided by the specific type of agitation performed in the body of the liquid. The agitator may be of such construction and driven at such speed that its mechanical action will also assist in breaking up the solid material and thus best conditioning the solid material so that the desired biochemical reactions may take place.

The mixed liquor in the oxidation ditch process is eventually delivered to a clarifier for separation and the clear effluent is discharged from the system. However, all of the sludge formed in the process and settled in the clarifier is returned to the oxidation ditch which is operated as a closed system. Since the net growth of the volatile suspended solids will increase, it is necessary periodically to remove some of the sludge from the process.

Based on the foregoing sewage treatment process an object of the invention is to provide a compact and unitary aerotor plant which can be completely designed and shop fabricated so as to save engineering time on the part of the municipality or other purchaser, wherein the unit is rendered compact so that its size is held to a minimum by employing common walls between adjacent chambers and wherein the basic advantages of the oxidation ditch process are obtained with the added advantages of requiring less land area.

Another and a more specific object of the invention is to provide an aerotor plant which is expandable by approximately one hundred percent. The flexibility of oxygenation capacity by changes in the depth of immersion of the cage rotors makes it possible to expand the present aerotor plant and as a result aeration tank volume, mixing and aeration can be obtained in various increments, to thereby provide for present load conditions and also materially expanded future load conditions.

Another object of the invention is to provide an expandable aerotor plant of the character described wherein provision is made for vertical adjustment of the effluent trough in the final settling tank in addition to vertical adjustment of the influent baffle, the scum trough and also the cage rotor supporting structure. These special adjustment features make it possible to operate the plant at a minimum depth of liquid in the aeration tank of approximately three feet and to thus increase the water level in increments to the maximum depth of approximately five and one-half feet, together with progressive increases in the rotor immersions.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIG. 1 is a vertical sectional view taken substantially on line 1—1 of FIGURE 2 and showing one form of a unitary aerotor plant embodying the adjustable elements of the invention, and which are shown in a position where the water level throughout the apparatus would be a minimum;

FIG. 2 is a top plan view of the aerotor plant as shown in FIGURE 1;

FIG. 3 is a vertical sectional view of an aerotor plant, the same as shown in FIGURE 1, but wherein the adjustable elements are located in a position for the maximum water level;

FIG. 4 is an elevational view taken substantially on line 4—4 of FIGURE 3 and showing the adjustable means for that section of the bridge which in turn carries the cage rotor;

FIG. 5 is a transverse sectional view taken substantially along line 5—6 of FIG. 4;

FIG. 6 is a transverse sectional view taken substantially along line 6—6 of FIG 4;

FIG. 7 is a fragmentary view showing in elevation the adjustable means for varying the vertical position of the inlet trough, and wherein the trough is shown in a low water level position;

FIG. 8 is a fragmentary view similar to FIG. 7 but which shows the high water level position for the inlet trough;

FIG. 9 is a sectional view showing details of the structure whereby the vertical position of the effluent weir for decanting the clear liquid can be adjusted; and FIG. 10 is a sectional view showing the control means for opening and closing the mud valve which is located in the aeration chamber.

In the form of the invention as shown in FIGS. 1, 2 and 3 the incoming liquid to be purified is delivered to the aerotor unit by the influent pipe 10 which terminates in the bar screen 11 and discharges into the tank generally designated by the numeral 12. The base of the tank is formed of concrete and the same will include the peripheral bottom wall portion 13 and the hopper type V-shaped sump portion 14. The outside circular wall 15 is formed of metal and the same is anchored at its base in the concrete bottom wall 13 and is reinforced at its upper end by the metal flange 16. At the side adjacent the influent pipe 10 the outside wall 15 is provided with a semi-circular wall 17, and which has a concrete bottom wall 18 to form a sludge holding tank with said wall 15.

The tank 12 supports a sectional two-part bridge structure such as 20 and 21, the bridge structure in turn having suspended therefrom the effluent weir, the cylindrical skirt and the cage rotor all of which will be more particularly explained as the description proceeds. The bridge section 20 essentially includes the horizontally positioned beams 22 which remain in fixed position since the beams are supported on the inside circular wall 23 located within the aeration tank 15. The wall 23 in effect forms an extension of the walls of the V-shaped sump 14 and the same is anchored at 24 in the concrete bottom wall 13. The bridge beams 22 span the peripheral race and also the clarifying chamber and have the hand railing 25 suitably fixed thereto.

The other section 21 of the bridge includes the beams 26 and which span the aeration chamber. At the ends of the beams the extensions 27, which are part of the beam structure, are supported in an adjustable manner by the apparatus shown in FIGS. 4, 5 and 6. A bracket 28 is located at the ends of the beams 26 and the brackets are in turn supported by the tank walls 15 and 23, respectively, being bolted thereto at 30. The threaded supporting rod 31 is also secured at 32 to its particular tank wall and the opposite end of the supporting rod is fastened at 33 to the bent end of the bracket 28. The extensions 27 telescope their particular rod and the same is held in position on the rod by the bottom nut 34 and by the top nut 35. Since the structure of FIG. 4 is repeated at each end of the beams 26, this section of the bridge can be adjusted vertically in order to position the cage rotor 37 for any particular liquid level within the aeration tank 15. In FIG. 1 the bridge section 21 is in a low position to properly locate the cage rotor for the low water level within the tank 15. In FIG. 3 the said bridge section 21 has been elevated to thus position the cage rotor for the high water level within the aeration tank.

The cage rotor 37 is suspended from the beams 26 by the end supports 38 and 40. The right hand end of the cage rotor is journalled in the support 38 and the left hand end is journalled in the support 40. The shaft at this end is operatively connected by the chain drive 41 with the electric motor 42 having a supported relation on the bridge section 21. The rotor essentially consists of end plates 43 connected by a plurality of blades 44 and accordingly by adjusting the vertical position of the cage rotor the extent of immersion of the blades in the liquid can also be adjusted to suit conditions.

The sewage purification unit 12 is divided into concentric chambers or compartments by the inside circular wall 23 and by the depending skirt 45. It was previously explained that the inside wall 23 is anchored at 24 in the concrete bottom of the unit and said wall is reinforced at its upper end by the metal flange 46. The depending skirt is spaced inwardly from the inside circular wall 23 so as to form a peripheral race through which the liquid wastes will flow in a circular and downward direction towards the hopper type bottom 14. The skirt is suspended from the inside wall 23 by the brackets 47 and said skirt extends some distance above the maximum liquid level of the tank to prevent overflow. Also the skirt extends in a downward direction to provide a deep peripheral race between the wall 23 and the skirt 45, and a deep contiguous clarifying chamber within the skirt.

The liquid from the aeration or outer agitation chamber between the concentric walls 15 and 23 is admitted to the peripheral race by the opening 48, FIGS. 7 and 8, and with which is associated the inlet trough 50. The inlet trough has a shape as best shown in FIG. 2 for directing the liquid flow around the peripheral race in a clockwise direction.

To accommodate the changes in the liquid level throughout the present aerotor unit, the invention provides adjustable structure for the inlet trough and which is shown in FIGS. 7 and 8. The liquid flow through the opening 48 in the wall 23 is from the aeration chamber into the peripheral race. The inlet trough is accordingly located within the peripheral race and the same has an open front with an arcuately shaped back wall. The open front is located against the opening and the curved back wall directs the liquid flow into the peripheral race. The plate 51 having the strengthening rib 52 suitably depends from the trough and a guide rail 52 is provided on wall 23 as guiding means for the combined unit. As the trough is elevated, the plate 51 serves as a closure for the opening 48 which is made long enough to function for all liquid levels of the aerotor plant. The adjustability of the inlet trough is effected by the threaded supporting rod 54 which is in turn supported by the tubular part 55 of the extending arm 56. The arm is fixed at 57 to one of the beams 22 and the tubular part 55 telescopes the rod 54, and said part 55 is held thereto by the top nut 58 and by the bottom nut 59. The adjustment of the parts as shown in FIG. 7 lowers the inlet trough for the low liquid level whereas the parts when adjusted as shown in FIG. 8 positions the inlet trough for the high liquid level.

In flowing around the peripheral race the liquid will eventually deposit sludge in the hopper type bottom 14. This sludge is removed by an air lift to be presently described. However, it will be understood that the liquid in the annular aeration chamber is continuously agitated by the cage rotor 37. This agitation also keeps the liquid moving around the chamber so that very little if any of the heavier particles settle out. Upon reaching the peripheral race, the agitation of the liquid is terminated. Eventually the liquid reaches a quiescent zone within the hopper type bottom 14, and particularly within the skirt 45 which forms a clarifying chamber for the liquid. The liquid must flow upwardly within the clarifying chamber towards the annular weir 60 and in so doing the liquid passes through a sludge blanket at the entrance to the clarifying chamber. This sludge blanket is formed by a heavy concentration of sludge particles and thus flocculation of the said particles is facilitated. The heavy flocculated particles settle out and the liquid is efficiently clarified by the time it reaches the weir 60 from which is flows into the effluent pipe 61 for discharge from the system.

The vertical position of the weir trough within the clarifying chamber will determine the level of the liquid within the aerotor unit. The said trough is suspended from the bridge beams 22 by the threaded rods 62 and provision is made for vertical adjustability of the weir. As best shown in FIG. 9 the threaded rods 62 are each fixed at their lower ends to the cross strap 63 by the nuts 64, FIG. 9. At the upper ends of the rods the nuts 65 secure the respective rod to a bracket 66 extending outwardly from the beams 22. The rods 62 and thus the weir trough 60 can be adjusted as regards its vertical position by manipulating the nuts 65. However, a slip joint 68 is additionally required between the weir structure and the upstanding portion of the effluent pipe 61. The part of the weir over the upstanding portion of the pipe 61 has a depending circular or tubular portion 67 and said portion has telescoping relation with the said effluent pipe 61. The slip joint between the parts is formed by a washer or ring 68 of resilient material. When the weir is in a low position for the low water levels, a substantial part of the vertical portion of pipe 61 is located within the tubular part 67. However, this makes possible the elevation of the weir to obtain the high water levels, and in all adjusted positions the slip joint 68 will prevent leakage around the effluent pipe.

The liquid sludge is removed from the sludge compartment formed by the walls 14 by an air lift 70 supplied by air under pressure from the pipe 71. The sludge is delivered by the air lift pipe 72 to the container 73 which functions as an air separator. The sludge pipe 74 connects with the base of the container 73 and discharges the sludge into the sludge holding tank 17. However, the pipe 75 which connects with 74 makes it possible to return the sludge to the aeration chamber when such operation is desired.

The scum from the peripheral race is collected by the scum box 76 located between the walls 23 and 45 and at that end of the race removed from the inlet trough 50. Here also an air lift 77 is provided for removing the scum through the pipe 78 for discharge into the aeration chamber. The scum box has a slip joint 80 similar to that as disclosed and described for the weir 60. Accordingly, the slip joint makes it possible to adjust the scum box vertically within the peripheral race to accommodate any change in level of the liquid.

When it becomes desirable to drain or partly drain the aeration chamber, the same can be accomplished by opening the mud valve 82, FIG. 10. The open mud valve will discharge the liquid through the pipe 83 into the sludge chamber formed by the walls 14. The casing 84 for the mud valve is anchored in the concrete wall 13 within the aeration chamber and said casing is integral with the discharge pipe 83. The valve member indicated by numeral 85 is fixed to the actuating rod 86. The upper end of the actuating rod is positioned by the bracket 87 and said end is provided with the hand wheel 86. A portion of the actuating shaft 86 is threaded at 90 and this intermediate portion has threaded relation with the fixed nut 91 carried by the bracket 87. A turn of the hand wheel 88 in the proper direction will thus lift the mud valve member 85 to open the valve and discharge the liquid and any accumulated sludge from the aeration chamber into the sludge chamber from which it is air lifted and disposed of as described.

In the aerotor plant of the invention the water level in the several chambers throughout the plant can be controlled by adjusting the vertical positioning of the effluent weir 60. It is possible to increase the operational design up to one-hundred percent, or in other words, the volume of liquid in the aeration tank can be doubled. The plant can be designed for load conditions such as may be encountered in the future and operated over the years at an infinite number of incremented increases. However, to accomplish the foregoing the plant must incorporate the several adjustable feature as described. The final or effluent weir trough must be adjustable in a vertical direction to adjust the water level to that desired. Along with this adjustment, the influent trough is made adjustable and also the cage rotor and the scum box.

In the operation of the apparatus as disclosed and described, the flocculation of the solids is largely accomplished in the peripheral race of the clarifier. However, in flowing upwardly in the clarifying chamber the fine solids are caused to flow into a sludge blanket and many of the finer solids, which normally would not settle, will adhere to other sludge particles and settle to the bottom of the chamber. Also the normal discharge from the sludge compartment 14 by the air lift 70 is to return the sludge to the aeration chamber. Only periodically is the valve setting in 74 changed so as to discharge the sludge to the holding tank 17.

A special design of rotor known as a cage rotor has been found to be highly efficient in inducing oxygenation and as a minor comminuting device. Rotor immersion increases as the liquid level increases so that the rotor can induce additional oxygen to handle the increased load that comes to the plant with increased flow. Normally the increase in load to the plant is in the same proportion as the increase in flow. There are possibilities where a load increment increase will vary from that of the flow. In either case, it is possible with the rotor, normally at constant speed, by increased immersion to handle the increased load or the variation in the increased load.

The apparatus of the aerotor plant as described is therefore an improvement over the aerotor plant as shown and described in my Pat. No. 3,448,861 granted June 10, 1969, wherein no provision is made for adjustability of the various parts. By incorporating the improvement of this invention, the aerotor plant can be designed for future load conditions, and notwithstanding, the plant can be operated over the years at the most optimum operational point for this particular type of process.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a liquid purification apparatus, a contained unit including an outer circular wall, an inner circular wall and a bottom wal supporting the circular walls, the said inner wall being disposed approximately concentrically with and in spaced relation within the outer wall to form an annular agitation chamber, influent means delivering liquid to be purified to the agitation chamber, a depending skirt located in spaced relation within the inner circular wall to provide a peripheral race around the skirt and a contiguous clarifying chamber within the skirt, an opening in the inner circular wall permitting flow of liquid from the agitation chamber into the peripheral race, an effluent weir within the clarifying chamber for decanting the clear liquid, means supporting the effluent weir for adjustment vertically within the clarifying chamber to thereby vary the level of the liquid throughout the purification unit, agitating means in the form of a rotor for mechanically agitating the liquid in the agitation chamber and for maintaining flow of the liquid around the chamber, means for supporting the rotor in a manner permitting vertical adjustment of the same whereby the rotor can be vertically positioned so as to conform to the various levels of liquid in the purification unit, means for removing the settled sludge from the bottom wall below the clarifying chamber, means for removing the scum from the peripheral race, and adjustable means for supporting said scum removing means permitting adjustment of the same vertically within the peripheral race.

2. Liquid purification apparatus as defined by claim 1, wherein the rotor is in the form of a cage rotor capable of accomplishing the necessary agitation and mixing for an efficient oxygenating inducing implement and minor comminuting device.

3. Liquid purification apparatus as defined by claim 1, additionally including an influent trough located in the peripheral race in associated relation with the opening in the inner circular wall, said influent trough discharging the liquid received from the agitation chamber tangentially into the peripheral race, and adjustable means for supporting the influence trough whereby to permit vertical positioning of the same to conform with the various liquid levels within the purification unit.

4. Liquid purification apparatus as defined by claim 1, additionally including an influent trough located in the peripheral race in associated relation with the opening in the inner circular wall, said influent trough discharging the liquid received from the agitation chamber tangentially into the peripheral race, adjustable means for supporting the influent trough whereby to permit vertical positioning of the same to conform with the various levels within the purification unit, and a closure plate unitary with the influent trough and depending below the same, said closure plate closing that part of the opening which may exist below the influent trough depending on its elevated position with respect to said opening.

5. In an expandable aerotor plant for the purification of liquid wastes, in combination, a contained unit including an outer circular wall, an inner circular wall, and a bottom wall supporting the circular walls, the said inner wall being disposed approximately concentrically with and in spaced relation within the outer wall to form an annular agitation chamber, influent means delivering liquid to be purified to the agitation chamber, a depending skirt located in spaced relation within the inner circular wall to provide a peripheral race around the skirt and a contiguous clarifying chamber within the skirt, an opening in the inner circular wall permitting flow of liquid from the agitation chamber into the peripheral race, an effluent weir within the clarifying chamber for decanting the clear liquid, an effluent conduit for receiving the clear liquid from the effluent weir and for discharging the same from the system, means supporting the effluent weir for adjustment vertically within the clarifying chamber to thereby vary the level of the liquid throughout the purification unit, means including a slip joint between the effluent weir and the effluent conduit whereby to permit said vertical adjustment of the effluent weir, agitating means as in the form of a cage rotor for mechanically agitating the liquid in the agitation chamber and for maintaining flow of the liquid around the chamber, means for supporting the cage rotor in a manner permitting vertical adjustment of the same, whereby the cage rotor can be vertically positioned so as to conform to the various levels of liquid in the purification unit, means for removing the settled sludge from the bottom wall below the clarifying chamber, means for removing the scum from the peripheral race, and adjustable means for supporting said scum removing means permitting adjustment of the same vertically within the peripheral race.

References Cited

UNITED STATES PATENTS

| | | | |
|---|---|---|---|
| 2,901,114 | 8/1959 | Smith et al. | 210—200 |
| 3,047,492 | 7/1962 | Gambrel | 210—7 |
| 3,295,682 | 1/1967 | Schramm | 210—195 |
| 3,312,346 | 4/1967 | Walker | 210—195 |
| 3,341,450 | 9/1967 | Ciabattari et al. | 210—15 X |
| 3,415,379 | 12/1968 | Thayer | 210—256 X |

FOREIGN PATENTS 970,470   9/1964   Great Britain.

MICHAEL E. ROGERS, Primary Examiner

U.S. Cl. X.R.

210—14, 195, 256, 512, 525